July 25, 1933.   C. H. WHITE   1,919,539

WHEEL

Filed Dec. 3, 1928   2 Sheets-Sheet 1

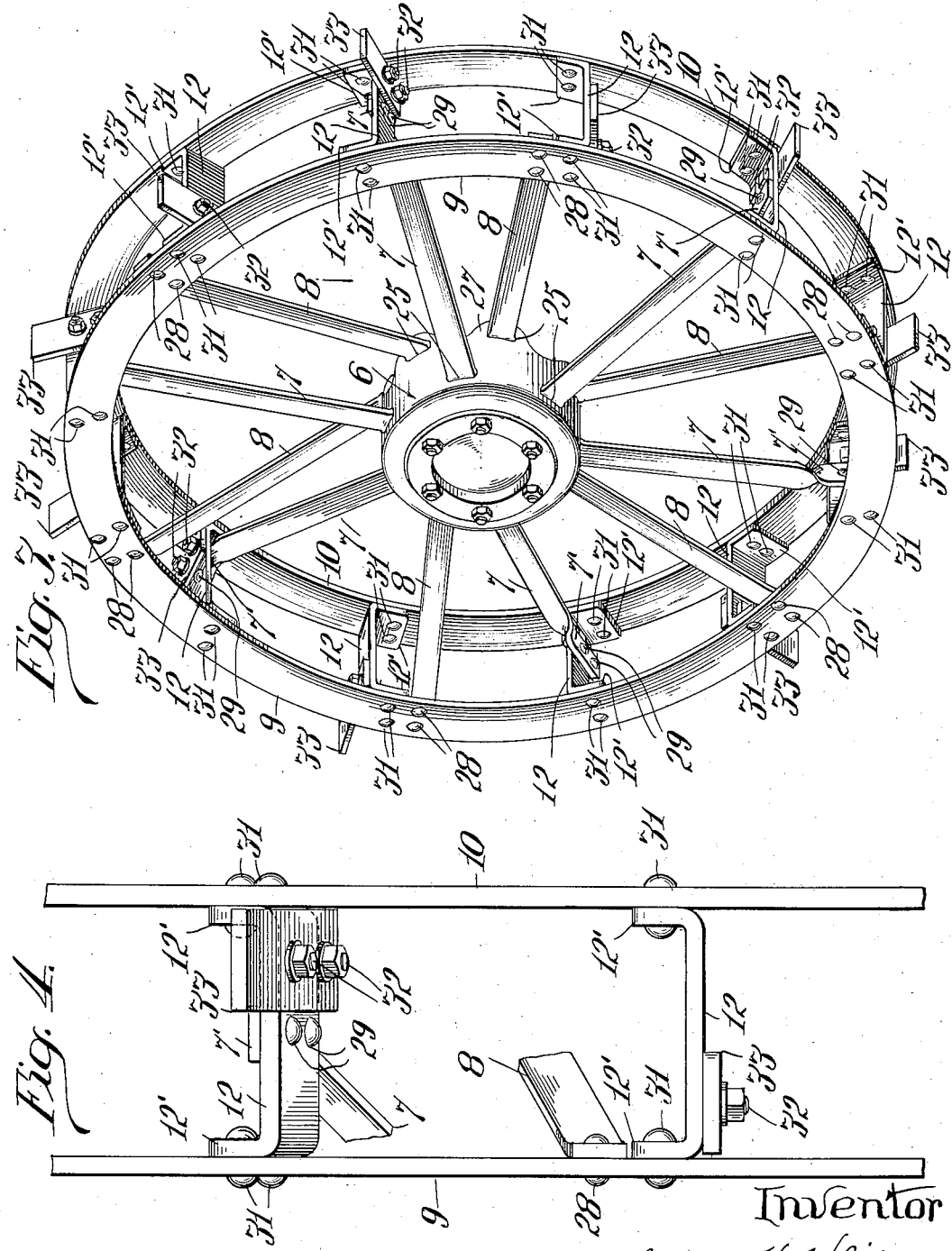

Patented July 25, 1933

1,919,539

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

WHEEL

Application filed December 3, 1928. Serial No. 323,216.

The present invention relates to wheels, and has particular reference to the construction of wheels designed for tractors, although the fundamental features of the invention may be embodied in wheels for agricultural implements and the like, particularly where such wheels are to have effective tractive engagement with the ground.

One of the principal characteristics of the wheel is the construction of the rim, which instead of being solid across the tread width of the wheel is of open-work construction built up of two side rings spaced apart and cross connected by transverse bars at intervals around the wheel. Such open-tread construction results in the wheel being self cleaning so that its rim does not cake up with mud when operating in soft soil.

One of the objects of the invention is to provide a wheel of this general description having an improved arrangement of traction cleats or lugs, which will act to compact the soil under the wheel, which will be self-cleaning for preventing soil becoming caked on the cleats, and which will substantially eliminate the tendency of the wheel to dig itself in when slipping in soft soil.

Another object of the invention is to provide a wheel of this open-tread construction having the spokes so arranged that part of the driving mechanism for the wheel can extend into the plane of the tread so as to be encompassed by it. By plane of the tread is meant the plane perpendicular to the axis of rotation of the wheel which passes midway through the tread. This is the plane in which the wheel would lie if it were considered as a single disc having no thickness. The center of pressure of the wheel on the ground normally lies in this plane. One purpose of such construction is to enable a greater spacing or clearance to be obtained between the driving mechanisms for the two traction wheels; also to place the point of bearing support of the wheel more closely to the plane of the tread above mentioned so as to arrange the point of bearing support substantially directly over the center of pressure.

Another object is to provide a wheel of the above description which will be light in weight, staunch and durable for resisting traction stresses, and inexpensive to construct.

Other objects and advantages of the invention will appear in the following description of a preferred embodiment thereof. In the accompanying drawings illustrating such embodiment:

Figure 1 is a side elevational view of the improved wheel, part of the outer side ring being broken away;

Figure 2 is a transverse sectional view taken approximately on the plane of the line 2—2 of Figure 1;

Figure 3 is a perspective illustration of the wheel, as viewed from the outer side; and Figure 4 is a fragmentary elevational view illustrating the construction of the open-tread.

In its general construction, the wheel comprises a hub 6, two series of spokes 7—8, and two laterally spaced side rings 9 and 10, which side rings, together with the transverse cross bars 12 connecting the same, make up the open tread of the wheel. In the specific embodiment herein shown the wheel has been constructed for mounting on stub axles 13 which are rotatably supported in separate axle housings 14 at each side of the tractor frame. These axle housings are preferably formed as tapered extensions of transmission housings 15 extending upwardly and forwardly from the wheel axis. Enclosed in each latter housing is a driving chain which passes over a large sprocket wheel mounted on the inner end of the stub shaft 13 within the housing 15. Said chain also passes over a driving sprocket disposed in the upper or forward end of the housing 15 and mounted on a jack shaft which enters the housing 15 through a tubular housing 16 projecting from the side of the tractor. This power transmission mechanism and its enclosing means also comprises a housing extension 17 projecting outwardly from the upper end of the housing 15, substantially in line with the shaft enclosing housing 16. It will be noted that in the described construction there is no arrangement of through axles extending to the center of the tractor, both wheels being supported on comparatively short stub axles 13; also that the tractor load is transmitted to each wheel through the transmission housings 16, 15 and 14. Such arrangement necessitates that the radial load of the wheel be carried on a comparatively short length of axle, and accordingly the axle housing 14 is extended through the wheel almost to the outer plane thereof to dispose the axle bearings contained within said housing substantially in the plane of the wheel tread. The housing extension 17 also extends into the plane of the tread. The wheel mounting above described exemplifies one form of tractor design to which the present wheel is readily adaptable by virtue of certain structural features to be hereinafter described, but it will be understood that the invention can be embodied in wheels for other wheel mountings and other designs of tractors.

The stub axle 13 is formed with a radially extending flange 18 which is apertured for receiving bolts 19. The main body of the wheel hub 6 slips over this radially extending flange, and has an inwardly extending flange 21 at its outer end which abuts the outer face of the flange 18 and engages an annular shoulder 22 formed in the face of the latter flange 18. The hub flange 21 is also apertured to receive the connecting bolts 19. Bearing against the inner side of the axle flange 18, within the wheel hub 6, is a ring 23 of angle cross section with its axially extending flange in proximity to the wheel hub. The connecting bolts 19 extend through said ring and are held against rotation by the engagement of their heads with said flange of the ring. It will be seen that the foregoing construction provides for ready demountability of the wheel, it merely being necessary to remove the nuts from the outer ends of the bolts 19, whereupon the wheel hub can be pulled off the end of the stub axle.

The annular body of the hub 6 extends inwardly over the axle housing 14 in spaced relation thereto, this portion of the hub having the two series of spokes 7 and 8 mounted therein. The spokes 7 have their inner ends anchored in the outer portion of the hub 6 and extend diagonally back into the plane of the wheel for attachment at their outer ends to the cross bars 12.

The other series of spokes have their inner ends anchored in the inner portion of the hub 6 and extend diagonally outwardly for attachment at their outer ends to the outer side ring 9. Both series of spokes have shoulders 25 which bear against the outer surface of the hub. Extending inwardly from this shouldered portion is a reduced portion which has its inner end upset or swaged outwardly in a counterbore in the hub, as indicated at 26, the upsetting or swaging operation drawing the shouldered portion 25 into tight engagement with the hub and rigidly anchoring the spoke therein. The spokes 8 are anchored in projecting lobes or lugs 27 extending inwardly from the body of the hub 6, such construction serving to reduce the weight of the hub. The outer ends of the spokes 8 are rigidly secured to the inner side of the outer tread ring 9 by rivets or bolts 28. The spokes are preferably of flat bar stock, and in attaching the outer ends of the spokes 7 to the cross bars 12 the end portions of the spokes are given a half twist or turn to form the attaching portions 7' which are rigidly secured to the cross bars by the rivets or bolts 29. It will be noted that the attachment portions 7' are secured to said cross bars substantially midway between the tread rings 9 and 10 whereby no spokes extend across the inner portion of the wheel structure and hence the housing extension 17 can protrude into this portion of the wheel, with the wheel tread encompassing such housing extension. The diagonal lines of the spokes 7 and 8 reinforce the wheel against side thrust.

The side ring members 9 and 10 are preferably constructed in the form of flat metal rings of considerable width radially of the wheel but having only their edges presented at the periphery of the wheel. The cross bars 12 are preferably constructed of flat bar stock with the ends bent laterally as indicated at 12' for receiving the rivets or bolts 31 which secure these bars to the inner sides of the side tread rings 9 and 10. As best shown in Figures 1 and 4, the cross bars 12 are disposed obliquely or non-radially of the wheel, being inclined in a rearward or trailing direction with reference to the forward rotation of the wheel. Rigidly secured to these cross bars by bolts 32 are traction cleats 33, the latter being secured to the front or leading surfaces of the cross bars and projecting outwardly beyond the peripheries of the tread rings at the same angle as the cross bars. In the preferred construction, the cleats do not extend across the entire width of the wheel, but are made narrower than the tread width. In such arrangement the alternate cleats are staggered or offset between opposite sides of the wheel, one cleat being secured to its cross bar 12 adjacent to the outer tread ring 9, the next succeeding cleat being secured to its cross bar 12 adjacent to the inner tread ring 10, etc.

This arrangement avoids any tendency of the cleats to dig out the soil if the wheel should slip in soft ground, since the slipping of one cleat does not dig out the soil which will be engaged by the next succeeding cleat and, in fact, the soil dug out by one cleat is displaced laterally to some extent into the path of the next cleat and actually increases the amount of soil in which the next cleat must engage.

The inclination of the cleats and cross bars in a trailing direction results in a compacting of the soil in the forward rotation of the wheel. As each cleat engages the ground with the tractive pull imposed thereon is compresses the soil downwardly and rearwardly, thereby packing the same for more efficient tractive engagement and for better sustaining the weight of the tractor. When the tread rings 9 and 10 penetrate the soil the inclined cross bars 12 aid the cleats in thus compacting the soil. Any soil tending to adhere to the cleats and cross bars is free to drop off these members on the upper side of the wheel through the open spaces in the tread. Thus the wheel is self-cleaning and does not become caked up with wet soil, as is frequently the case with wheels having solid peripheries. By releasing the bolts 32 the cleats can be readily removed for replacement in the event of wear, such cleats consisting merely of flat plates and being very inexpensive. The removal of the cleats also readily adapts the wheel to travel on hard surface roads.

Having thus described my invention, what I claim as new and desire to secure by Letters Patent is:

1. In a wheel of the class described, the combination of a hub, two laterally spaced side ring members, cross bars extending between said ring members and defining therewith an open-tread rim portion, and two series of spokes extending between said hub and said rim portion, one series of spokes being secured at their outer ends to said cross bars, and the other series of spokes being secured at their outer ends to the side ring member on the outer side of the wheel.

2. In a wheel of the class described, the combination of a hub, two laterally spaced side ring members, cross bars extending between said ring members and defining therewith an open-tread rim portion, and two series of spokes extending between said hub and said rim portion, one series of spokes being secured at their outer ends to said cross bars at points intermediate said side ring members, and the other series of spokes being secured at their outer ends directly to one of said ring members.

3. In a wheel of the class described, the combination of a hub, a rim portion comprising laterally spaced side ring members and transverse bars extending therebetween, and spokes extending between said hub and said transverse bars, said spokes being constructed of bars having their outer ends twisted to form attaching portions for attachment to the transverse bars of said rim portion.

4. In a wheel of the class described, the combination of a hub, a rim portion comprising laterally spaced side ring members and transverse bars extending therebetween, the inner end of said hub being provided with longitudinally extending angularly spaced projections, and spokes extending between said hub and said rim portion and having their inner ends anchored in said projections.

5. In a wheel of the class described, the combination of a hub, two laterally spaced side ring members, cross bars extending between said ring members defining therewith an open-tread rim portion, and two series of spokes extending between said hub and said rim portion, certain of said spokes being secured at their inner ends to one end of said hub, one series of said spokes being secured at their outer ends to said cross bars, and the other series of spokes being secured at their outer ends to one of the side ring members.

6. In a wheel of the class described, the combination of a hub, two laterally spaced side ring members, cross bars extending between said ring members defining therewith an open tread rim portion, and two series of spokes extending between said hub and said rim portion, one series of said spokes being secured at their inner ends to one end of the hub and at their outer ends to said cross bars, and the other series of said spokes being secured at their inner ends to the opposite end of said hub and at their outer ends to the outer ring member, whereby alternate spokes extend diagonally in opposite directions to brace the wheel against side thrust.

7. A wheel of the class described, comprising an annular hub portion, a pair of laterally spaced ring members, one of said members lying in a plane intersecting said annular hub while the other of said ring members lies in a plane outside of said hub, a plurality of cross bars extending between said ring members and defining therewith an open-tread rim portion, a plurality of spokes radiating from said hub and connected therewith and with said first named ring member, and a second group of spokes radiating from said hub and connected with said cross bars at points in a plane which lies outside of said hub.

8. A wheel of the class described comprising, in combination, a hub including a substantially cylindrical body portion, two laterally spaced ring members, one of said members lying in a plane which intersects said cylindrical body portion while the other ring member lies in a plane which falls to one side of said hub, a plurality of cross bars extending between said ring members and defining therewith an open-tread rim portion, a plurality of spokes connected with said cylindrical body portion of the hub at points toward said second ring member and connected with said first ring member, and a second group of spokes connected with the body portion of the hub at the other end and extending in crossed relation with said first spokes and connected with said cross bars.

9. A wheel of the class described comprising, in combination, a pair of laterally spaced ring members, cross bars extending between said ring members and defining therewith an open-tread rim portion, a hub for said wheel occupying a position to one side of the central plane which passes through the center points of said cross bars midway between said ring members, spokes connecting said hub and the adjacent ring member, and other spokes connected with said hub and the cross bars substantially at their mid-points.

10. In a wheel of the class described, the combination of a hub, two laterally spaced side ring members formed of flat stock with their outer edges forming the periphery of the wheel, cross bars extending between said ring members and defining therewith an open-tread rim, said cross bars being inclined non-radially with respect to the wheel in a direction to compact the soil with the forward rotation of the wheel, two series of spokes extending between said hub and said rim portion, one series of spokes having their outer ends twisted and bent non-radially and secured to said cross bars, and the other series of spokes being secured at their outer ends to the side ring member on one side of the wheel, traction cleats projecting outwardly beyond said rim, said cleats providing extensions of said cross bars and being also inclined non-radially with respect to the wheel in a direction for compacting the soil with the forward rotation of the wheel.

11. In a wheel of the class described, the combination of a hub, a rim portion comprising laterally spaced side ring members and transverse bars extending therebetween, said transverse bars being inclined non-radially with respect to the wheel in a direction for compacting soil with the forward rotation of the wheel, and spokes extending between said hub and said transverse bars, said spokes being constructed of bars having their outer ends twisted and bent angularly to form attaching portions for attachment to the transverse bars of said rim portion.

12. In a wheel of the class described, the combination of a hub, two laterally spaced side ring members formed of flat stock with their outer edges forming the periphery of the wheel, cross bars extending between said ring members and defining therewith an open-tread rim, two series of spokes extending between said hub and said rim portion, one series of spokes being secured at their outer ends to said cross bars, and the other series of spokes being secured at their outer ends to the side ring member on one side of the wheel, traction cleats projecting outwardly beyond said rim and staggered in transverse location on the wheel, said spokes being also staggered and secured to the ring member and to the cross bars, respectively, at points adjacent the points of attachment of said staggered cleats.

CHARLES H. WHITE.